United States Patent
Sirkett et al.

(10) Patent No.: US 10,899,001 B2
(45) Date of Patent: Jan. 26, 2021

(54) METHOD FOR TEACHING AN INDUSTRIAL ROBOT TO PICK PARTS

(71) Applicant: ABB Schweiz AG, Baden (CH)

(72) Inventors: Daniel Sirkett, Västerås (SE); Jeremy Pouech, Chaville (FR); Peter Fransson, Västerås (SE)

(73) Assignee: ABB Schweiz AG, Baden (CH)

( * ) Notice: Subject to any disclaimer, the term of this patent is extended or adjusted under 35 U.S.C. 154(b) by 279 days.

(21) Appl. No.: 15/778,963

(22) PCT Filed: Dec. 3, 2015

(86) PCT No.: PCT/EP2015/078490
§ 371 (c)(1),
(2) Date: May 24, 2018

(87) PCT Pub. No.: WO2017/092809
PCT Pub. Date: Jun. 8, 2017

(65) Prior Publication Data
US 2018/0345483 A1 Dec. 6, 2018

(51) Int. Cl.
*B25J 9/16* (2006.01)
*B25J 9/00* (2006.01)

(52) U.S. Cl.
CPC .......... *B25J 9/0081* (2013.01); *B25J 9/1612* (2013.01); *B25J 9/1697* (2013.01)

(58) Field of Classification Search
USPC .................................. 700/245–264
See application file for complete search history.

(56) References Cited

U.S. PATENT DOCUMENTS

| | | | | |
|---|---|---|---|---|
| 4,611,292 A | * | 9/1986 | Ninomiya | B25J 19/023 348/94 |
| 4,613,942 A | | 9/1986 | Chen | |
| 4,876,728 A | * | 10/1989 | Roth | G06K 9/34 382/153 |

(Continued)

FOREIGN PATENT DOCUMENTS

| | | |
|---|---|---|
| EP | 2481529 A1 | 8/2012 |
| JP | 2015016527 A | 1/2015 |
| WO | WO-2014161603 A1 * 10/2014 | B25J 9/1607 |

OTHER PUBLICATIONS

Carlos Martinez, et al.: "Automated 3D vision guided bin picking process for randomly located industrial parts", 2015 Industrial Technology (ICIT) and IEEE International Conference on. Seville, Spain Mar. 17-19, 2015.

(Continued)

*Primary Examiner* — Jonathan L Sample
(74) *Attorney, Agent, or Firm* — Whitmyer IP Group LLC

(57) ABSTRACT

A method for teaching an industrial robot to pick parts includes the steps of: placing a reference part on a picking surface; providing a reference image including information about the reference part; placing a gripping tool of the industrial robot in relation to the reference part so that the gripping tool is in a grasp configuration in relation to the reference part; and storing the grasp configuration. The reference image is a 2D image from below. When the reference part is resting on a known plane a 2D image taken from below is enough for defining the position of the same.

21 Claims, 3 Drawing Sheets

(56) References Cited

U.S. PATENT DOCUMENTS

| | | | | |
|---|---|---|---|---|
| 5,125,149 | A * | 6/1992 | Inaba | B23Q 7/10 29/430 |
| 5,506,682 | A | 4/1996 | Pryor | |
| 5,802,201 | A | 9/1998 | Nayar et al. | |
| 6,002,125 | A | 12/1999 | Schubert | |
| 6,046,462 | A * | 4/2000 | Yokajty | G01N 21/8901 250/223 B |
| 6,934,605 | B1 * | 8/2005 | Dothan | G05B 19/41815 700/245 |
| 8,958,912 | B2 * | 2/2015 | Blumberg | G05B 19/42 700/259 |
| 9,102,055 | B1 * | 8/2015 | Konolige | G06T 7/593 |
| 2005/0151092 | A1 * | 7/2005 | Kitagawa | C12M 35/00 250/442.11 |
| 2010/0063629 | A1 * | 3/2010 | Battisti | B25J 9/1679 700/259 |
| 2012/0053724 | A1 * | 3/2012 | Okamoto | B25J 9/1682 700/114 |
| 2013/0211593 | A1 * | 8/2013 | Domae | B25J 9/1612 700/258 |
| 2014/0100694 | A1 * | 4/2014 | Rueckl | B25J 9/1692 700/254 |
| 2015/0003678 | A1 * | 1/2015 | Watanabe | B25J 9/1697 382/103 |
| 2015/0125035 | A1 * | 5/2015 | Miyatani | B25J 9/1697 382/103 |
| 2015/0142171 | A1 * | 5/2015 | Li | B25J 9/1692 700/251 |
| 2015/0224650 | A1 * | 8/2015 | Xu | B25J 9/1697 700/213 |
| 2015/0352721 | A1 * | 12/2015 | Wicks | B25J 9/1664 700/228 |
| 2016/0059419 | A1 * | 3/2016 | Suzuki | B25J 9/1697 700/114 |
| 2016/0288330 | A1 * | 10/2016 | Konolige | H04N 13/239 |
| 2017/0008172 | A1 * | 1/2017 | Cronie | B25J 9/1669 |
| 2018/0345483 | A1 * | 12/2018 | Sirkett | B25J 9/1612 |
| 2018/0354137 | A1 * | 12/2018 | Sirkett | B25J 9/1692 |

OTHER PUBLICATIONS

International Search Report and Written Opinion of the International Searching Authority Application No. PCT/EP2015/078490 Completed: Jun. 21, 2016; dated Jun. 28, 2016 11 pages.

* cited by examiner

METHOD FOR TEACHING AN INDUSTRIAL ROBOT TO PICK PARTS

TECHNICAL FIELD

The present invention relates to part picking applications of industrial robots.

BACKGROUND

In automated industrial systems, industrial robots are used to pick parts on from a picking surface. Such systems comprise a part feeder including the picking surface for receiving parts to be picked, a vision system arranged to localize parts distributed on the picking surface, and an industrial robot holding a gripping tool configured to grasp parts from the picking surface. The picking surface is, for example, a surface of a conveyor belt. There exist many feeding devices using different principles and which are suitable for different specific tasks. One type of part feeder is a type in which randomly oriented parts are fed onto the picking surface.

To locate the parts on the picking surface, the system is generally equipped with a vision system which includes one or more sensors, such as cameras, and a lighting system. The vision system is typically used in order to determine the positions of the parts on the picking surface, and to determine which parts are correctly positioned in order to be pickable by the robot. In the context of this disclosure the terms "positions" or "relative positions" should be considered to include also orientations and relative orientations, respectively.

In the prior art, the vision system makes use of a camera that is mounted directly overhead of the picking surface. The camera takes images of the parts dispersed on the picking surface and these images are used to direct the robot holding the gripping tool to the part to be picked.

From U.S. Pat. No. 4,876,728 is known a microprocessor based vision system that includes an overhead camera and two overhead light sources arranged over a conveyor belt, which system is interfaced with a robot system.

From U.S. Pat. No. 6,002,125 it is known to arrange the light-sensitive sensors underneath a transparent picking surface with a light source located above the picking surface for determining the position of parts on a conveyor belt moving relative to the sensors. The sensors are mounted at the underside of a fixedly mounted transparent glass plate, above which the conveyor belt slides. The light-sensitive sensors are arranged to register the light radiance generated by the parts passing between the light source and the sensors.

The vision system comprises vision algorithms for analysing the images taken by the sensors and extracting the coordinates of the parts to be picked. During teaching for a new part, the vision algorithms must be tuned to reach good performance. This tuning can be divided in three main steps:
  Step 1: Calibration of the vision system. During calibration, the correspondence between the coordinates in the camera frame and the robot frame are determined.
  Step 2: Teaching of the part to grip. This step includes definition of the part and its features, and training of the part recognition algorithm.
  Step 3: Definition of the grasp configuration. This step includes specification of the way of picking the part, i.e. determining the position relative to the part in which the gripping tool should be to grasp the part.

A problem with a part picking systems using a robot is that the teaching of the vision system is difficult and time consuming. Nowadays tools for teaching the vision algorithms require a series of inputs to be well teached and to give robust results. Usually the user needs to have a good knowledge to handle the associated vision software. It takes generally a few days to manually teach the vision system to a specific application and to get a robust behaviour.

An article "Automated 3D vision guided bin picking process for randomly located industrial parts" (pages 3172 to 3177) written by Carlos Martinez, Heping Chen and Remus Boca, published in 2015, discloses a random 3D bin picking system integrating a vision system with a robot system. The vision system identifies the position of candidate parts, and the robot system validates if one of the candidate parts is pickable. If a part is identified as pickable, then the robot will pick up this part. The vision system includes a 3D camera mounted on the gripping tool, and identifies part positions from captured 3D images of the parts. The identified part positions are sent to a robot controller to control the motion of the robot to pick up the part. The 3D camera is calibrated to establish the relationship between the camera frame and the robot frame. The relationship between the camera frame and the robot frame has to be determined in order to calculate the part position for the robot to pick up the part. Since there are many different parts in a bin, the vision system has to differentiate one part from another. Therefore, the vision system has to be trained in part recognition. Part features for the part recognition and grasp points are trained in the vision system by using a 3D image of the part that will be picked. Edge information is obtained by processing the 3D image of the part. After identifying the part, a 3D model of the part is defined. This 3D model will be used at runtime to calculate an accurate position of the part.

When the vision system has obtained the 3D model of a part, a plurality of grasp points are defined for the part using the same 3D model. The grasp points are defined by marking the areas where the gripping tool will approach and pick the parts. At runtime, the vision system will validate a grasp point by checking that there isn't another part in the marked areas for the grasp points in the 3D image obtained at runtime. For each grasp point, the user must jog the robot with the gripping tool to the part used to create the 3D model, and save this position as a master position. The positions will be saved with reference to the part, which at runtime will be translated and oriented to the robot frame.

SUMMARY

One object of the invention is to provide an improved method for teaching an industrial robot to pick parts, which method is simple and fast.

This object is achieved by the method and device according to the invention.

The invention is based on the realization that by assuming that all pickable parts are resting on a known plane a 2D image taken from below is enough for defining the positions of the pickable parts.

According to a first aspect of the invention, there is provided a method for teaching an industrial robot to pick parts. The method comprises the steps of: placing a reference part on a picking surface; providing a reference image comprising information about the reference part; placing a gripping tool of the industrial robot in relation to the reference part so that the gripping tool is in a grasp configuration in relation to the reference part; and storing the grasp configuration. The reference image is a 2D image from below.

According to one embodiment of the invention, the reference image is taken by means of an image scanner.

According to one embodiment of the invention, the picking surface is planar.

According to one embodiment of the invention, the reference image only contains information about those portions of the reference part that are against the picking surface.

According to one embodiment of the invention, the method further comprises the steps of: determining at least one recognizing feature of the reference part based on the reference image; and storing the at least one recognizing feature.

According to one embodiment of the invention, said at least one recognizing feature of the reference part is at least a part of the outline of the reference part.

According to one embodiment of the invention, the method further comprises the steps of: taking a surface image of the picking surface without any part from below; storing the surface image; detecting pixels corresponding to the recognizing feature in the reference image by using the surface image; and detecting the part based on the detected pixels.

According to one embodiment of the invention, said surface image is taken by the same means as the reference image.

According to one embodiment of the invention, said reference image also comprises information about the gripping tool in the grasp configuration, and the method further comprises the step of determining and storing a picking zone for the reference part based on the reference image.

According to one embodiment of the invention, the method further comprises the steps of: taking a part image comprising information about at least one part located on the picking surface; detecting the at least one part in the part image; determining a position of the at least one part on the picking surface based on the part image; and calculating a grasp position for the gripping tool based on the determined position and the grasp configuration.

According to one embodiment of the invention, said part image is taken by the same means as the reference image.

According to one embodiment of the invention, the method further comprises the step of checking if the part is reachable by the gripping tool by verifying that no other part or other obstacle on the picking surface is within the picking zone of the part to be picked based on the part image.

According to a second aspect of the invention, there is provided a part picking system comprising: a picking surface, an image device under the picking surface for providing a reference image comprising information about a reference part on the picking surface, and a gripping tool for grasping the reference part. The part picking system further comprises a data processing unit configured to calculate a relative position of the gripping tool and the reference part.

BRIEF DESCRIPTION OF THE DRAWINGS

The invention will be explained in greater detail with reference to the accompanying drawings, wherein.

DETAILED DESCRIPTION

Figure 1:
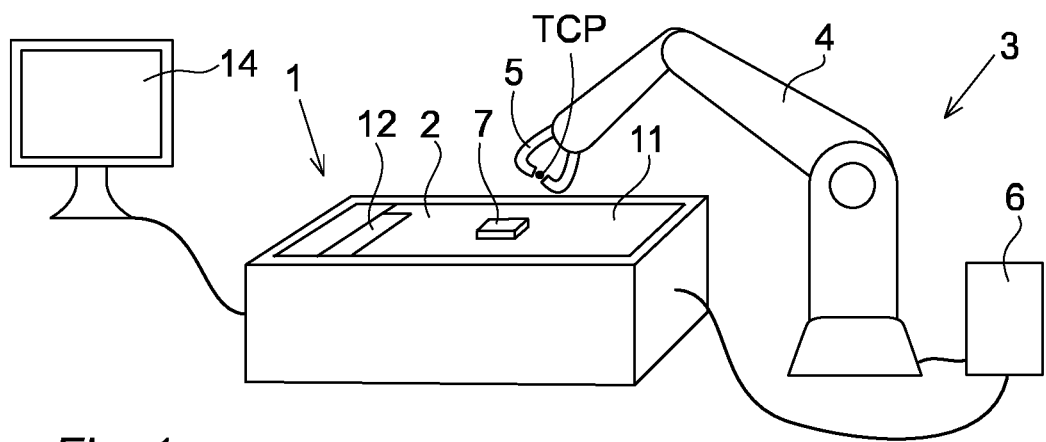
FIG. 1 shows a part picking system in which the method according to the present invention can be applied, FIG. 2 schematically illustrates, in cross section, an example of an image scanner in the part picking system of FIG. 1.

Referring to FIG. 1, a part picking system comprises a part feeder 1 including a picking surface 2 for receiving parts 120, 122 to be picked, and an industrial robot 3 with a gripping tool 5 configured to grasp parts 120, 122 (see FIG. 6) from the picking surface 2. The robot 3 includes a mechanical structure, also denoted a manipulator 4, and a control unit 6 for controlling the movements of the manipulator 4. The manipulator 4 has a plurality of arms that are movable relative to each other about a plurality of axes. The movements of the axes are driven by motors mounted on respective axes. The speeds and accelerations of the axes are controlled by the control unit 6. The axes are equipped with position sensors, such as angle-measuring devices, to provide position feedback signals. The feedback signals from the position sensors are transferred to the control unit 6. The position of the gripping tool 5 is, for example, given by the position of a Tool Center Point (TCP) defined for the tool. The TCP is defined in 6 degrees of freedom: three positional coordinates (x, y, z) and three angular coordinates ($\theta 1$, $\theta 2$, $\theta 3$). The position of the TCP is given by the positions of the axes of the robot 3, and can be calculated based on the signals from the position sensors of the robot 3.

The part picking system further comprises an image scanner 12 located underneath the picking surface 2 and arranged to provide part images i.e. 2D images of parts 120, 122 distributed on the picking surface 2. The picking surface 2 is an upper surface of a planar, horizontal and transparent glass plate 11. The image scanner 12 is disposed underneath the glass plate 11, and arranged linearly movable in relation to the same to allow scanning of parts 120, 122 located on the picking surface 2. The scanner is, for example, a CCD scanner or a CIS (contact image sensor) scanner. The part picking system may also comprise a user interface 14 configured to receive user commands. The user interface 14, is for example, a touch screen and/or a key board, or any other known suitable user interface 14.

In the context of the present disclosure the term "image" shall be considered to cover not only a visible illustration of a thing, but also any information on the basis of which such visible illustration can be generated. For example, the image scanner 12 provides numerical information on the basis of which a visible illustration of a part 120, 122 can be generated. However, it may not be necessary to generate the visible illustration for the purposes of the present invention but processing of the numerical information may suffice. Moreover, the provision of the images may be based on other physical phenomena than visible light. The glass plate 11 can thereby be replaced by any suitable planar plate that can either be transparent or opaque.

Figure 2:
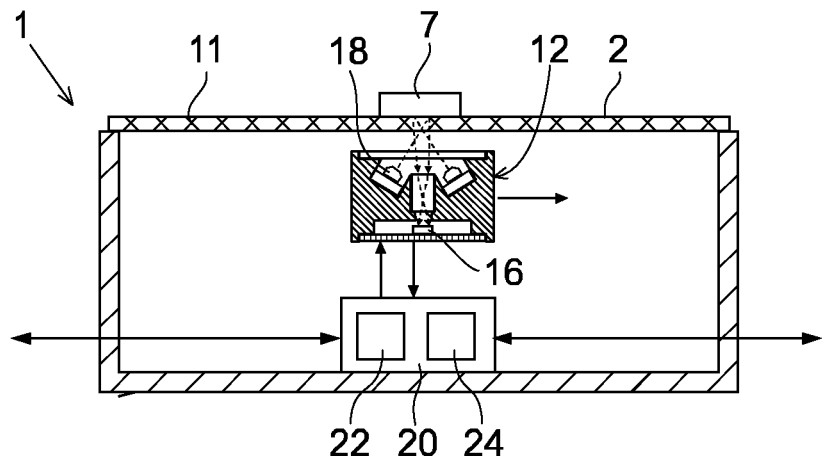

FIG. 2 schematically shows a cross section of the part feeder 1 of FIG. 1. The image scanner 12 comprises one or more image sensors 16, and at least one light source 18, both located underneath the glass plate 11. The part feeder 1 further comprises a data processing unit 20 configured to control the image scanner 12. The data processing unit 20 comprises necessary hardware and software for controlling the image scanner 12 and for providing image processing functions. The data processing unit 20 may comprise a processor, memory, and communication hardware. The user interface 14 is connected to the data processing unit 20, and the data processing unit 20 is configured to receive user commands from the user interface 14. A robot operator may order the image scanner 12 to start a scanning via the user interface 14, and the data processing unit 20 is configured to send a command to the image scanner 12 to start a scanning upon receiving the order from the user interface 14.

The data processing unit 20 is configured to receive the part images from the image scanner 12, and to determine positions of the parts 120, 122 on the picking surface 2 based on the part images. The data processing unit 20 and the robot controller 6 are configured to communicate with each other. The data processing unit 20 sends information on parts 120, 122 to be picked to the robot controller 6, including positions of the parts 120, 122 to be picked. The data processing unit 20 further comprises vision algorithms. The vision algorithms are, for example, implemented as software modules executed by the data processing unit 20. The vision algorithms are divided into two portions, a teaching portion and a recognition portion. The teaching portion of the data processing unit 20 comprises a teaching module 24 configured to teach the robot 3 how to grasp a reference part 7. The teaching module 24 is further configured to define how to recognize the reference part 7. The recognition portion includes a part recognition module 22 configured to recognize parts 120, 122 distributed on the picking surface 2 and to determine the positions of the parts 120, 122 based on the part images taken by the image scanner 12. The part recognition module 22 is executed during operation of the part picking system. The teaching module 24 is executed beforehand, in order to teach the system how to identify the parts 120, 122 to be picked and how to grasp the parts 120, 122.

A term "grasp configuration" is used to refer to a desired relative position of the gripping tool 5 and the reference part 7 just before the grasping takes place. The teaching module 24 is configured to upon command store a grasp position i.e. absolute position of the gripping tool 5 in a robot frame when in the grasp configuration, the grasp position being given by the position sensors of the robot 3. The teaching module 24 is further configured to order the image scanner 12 to provide a reference image i.e. a 2D image of the reference part 7 located on the picking surface 2, and to determine and store the position of the reference part 7 based on the reference image. From the stored positions of the gripping tool 5 and the reference part 7 the grasp configuration can be calculated. The teaching module 24 is further configured to determine at least one recognizing feature of the reference part 7 based on the reference image, and to store the recognizing feature.

Figure 3:
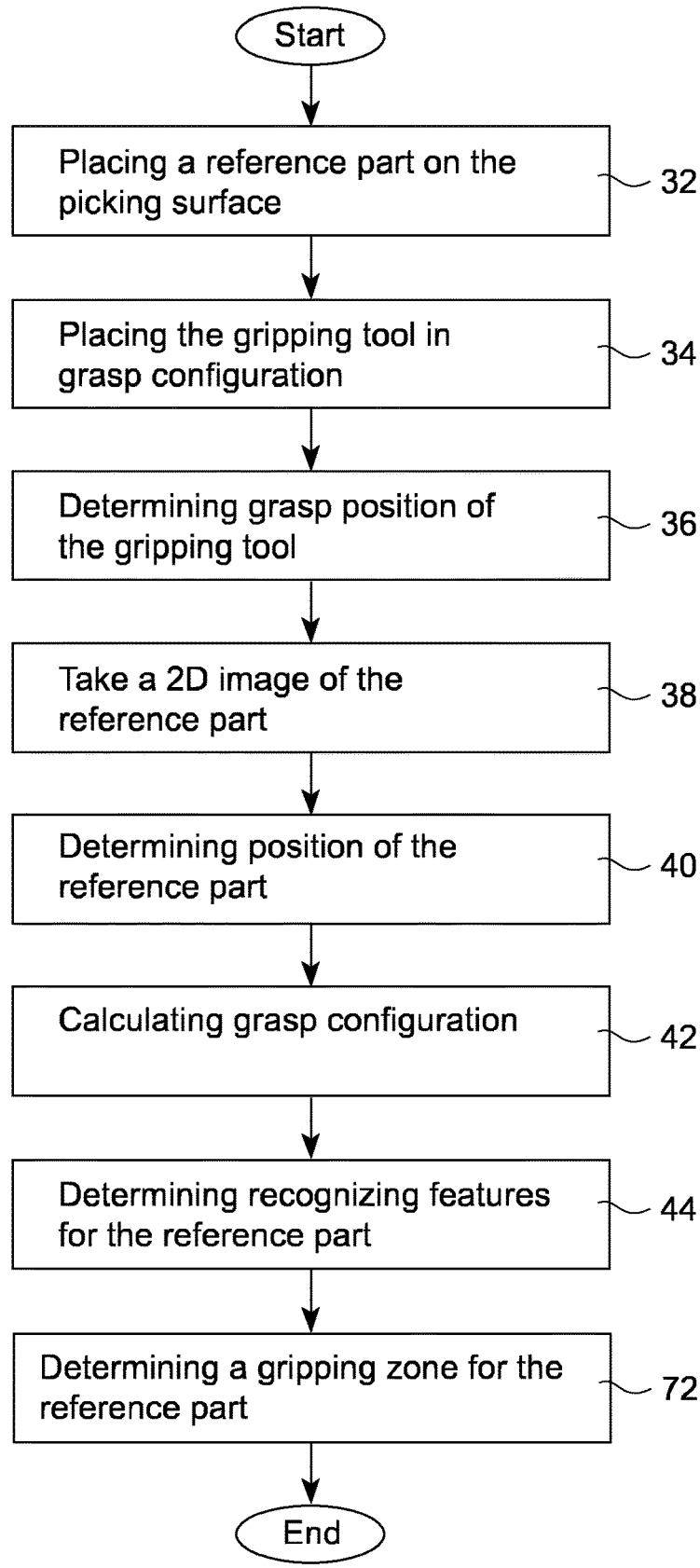
FIG. 3 shows a flowchart of a method according to one embodiment of the invention.

FIG. 3 shows a flowchart of an example of the teaching portion of the vision algorithms. Before the teaching can start, the vision system must be calibrated to establish the relationship between an image frame and the robot frame, i.e. to determine the relation between a coordinate system of the images and a coordinate system of the robot 3. The calibration can be made in many different ways. It can for example be based on recognizing a known object in the gripping tool 5 whose position is known in the robot frame, or on recognizing a reference part 7 left by the robot 3 on a known position on the picking surface 2.

During the teaching, a reference part 7 is used. The reference part 7 is identical with the parts 120, 122 to be picked, and it is placed on the picking surface 2 in a certain pose in which the parts 120, 122 are pickable. If there are several such poses, the teaching can be carried out with several poses of the reference part 7. The appearance of the reference part 7 in each pose from below thereby corresponds to appearances of the parts 120, 122 to be picked (in the same pose) from below. The teaching method comprises placing the reference part 7 and the gripping tool 5 in a grasp configuration. This step can, for example, be done by first placing the reference part 7 on the picking surface 2, and then moving the gripping tool 5 to the grasp configuration. Alternatively, this can be done by first placing the gripping tool 5 in a grasp position, on or above the picking surface 2, and then placing the reference part 7 on the picking surface 2 so that the gripping tool 5 is in the grasp configuration in relation to the reference part 7.

Figure 4:
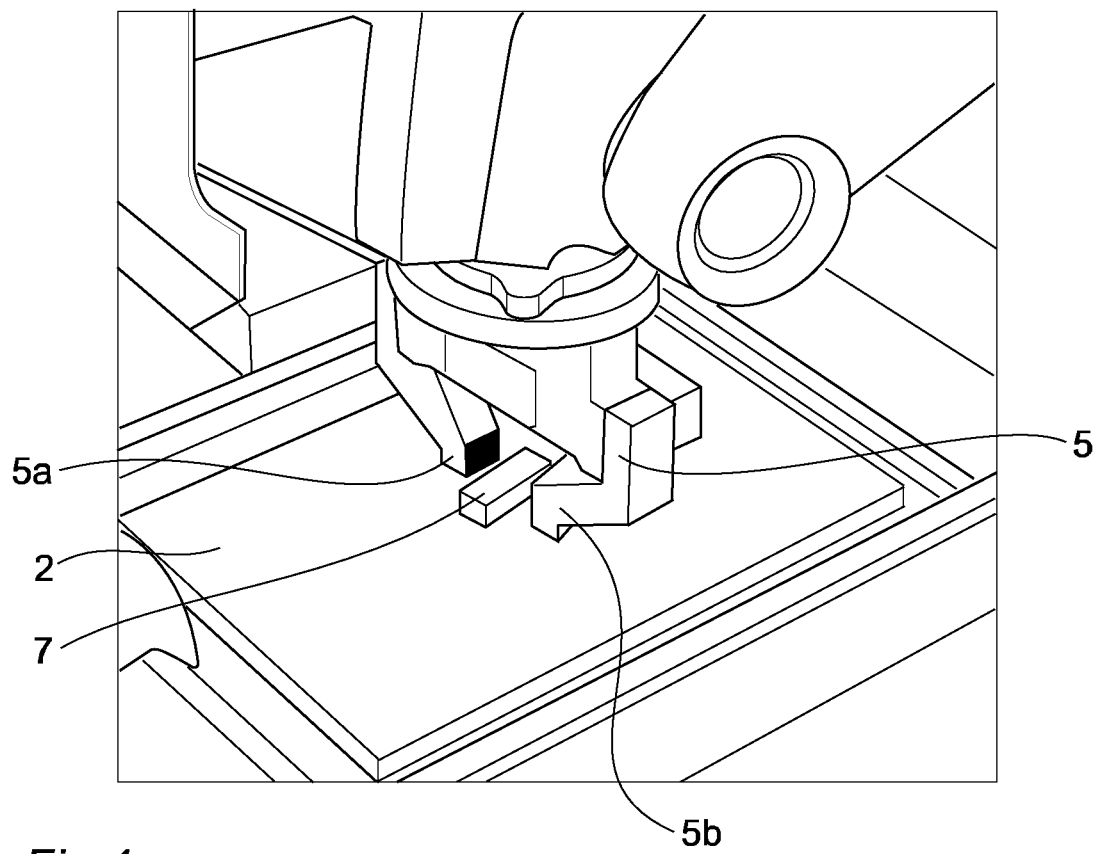
FIG. 4 shows a reference part and a gripping tool in a grasp configuration.

Referring to FIGS. 3 and 4, the reference part 7 is first placed on the picking surface 2, block 32. The gripping tool 5 is placed in a grasp configuration, block 34. For example, if the gripping tool 5 includes two gripping fingers 5a, 5b, the gripping fingers 5a, 5b are separated in the grasp configuration to allow the reference part 7 to be located between the gripping fingers 5a, 5b. The gripping tool 5 is not necessarily located on the picking surface 2 but it can also be located above the picking surface 2. When an operator moves the gripping tool 5 to the grasp configuration, he can use a lead-through functionality, jogging of the robot 3, or other approaches. In the grasp configuration, the gripping tool 5 is ready for grasping the reference part 7. In this manner, the operator can choose the way the robot 3 picks up the parts 120, 122.

In a next step, the grasp position of the gripping tool 5 is determined and stored, block 36, based on the position sensor outputs. The TCP is determined in the robot frame. The calculated TCP is, for example, transferred to the data processing unit 20 and stored by the same. A reference image is taken from below the picking surface 2, block 38. The reference image must include the reference part 7. The reference image may also include the gripping tool 5. However, it is not necessary that the reference image includes the gripping tool 5. The position of the reference part 7 is determined based on the reference image, block 40. This can be done using a common image processing algorithm. The grasp configuration is calculated based on the determined position of the gripping tool 5 and the determined position of the reference part 7, block 42. The grasp configuration is stored and can be used during operation of the part picking system for calculating a respective grasp position of the gripping tool 5 using a determined position of a part 120, 122 to be picked and the stored grasp configuration.

Figure 5:
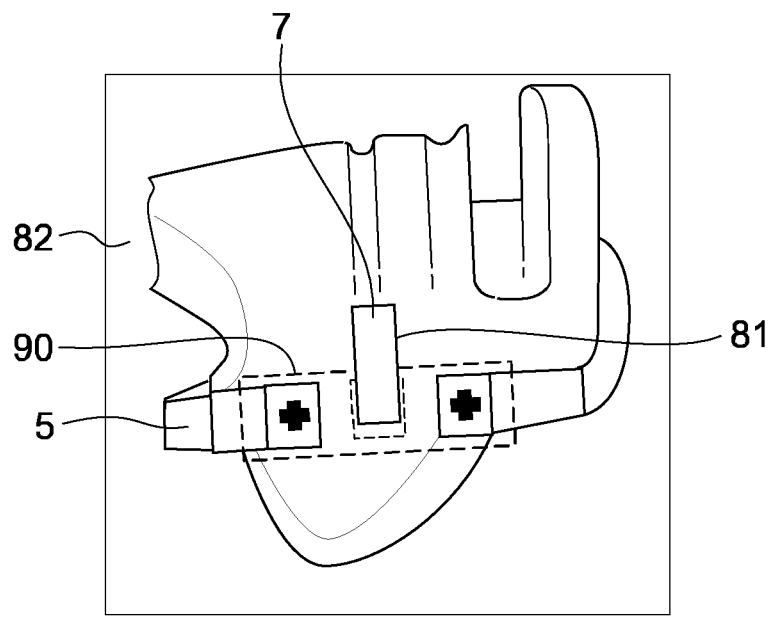
FIG. 5 shows a 2D image of the reference part and the gripping tool in the grasp configuration of FIG. 4.

Referring to FIGS. 3 and 5, in a next step, the vision system is taught to recognize parts 120, 122 to be picked based on the reference image. At least one recognizing feature of the reference part 7 is determined based on the reference image, block 44. The recognizing feature is, for example, the outline 81 of the reference part 7, or a part of the outline 81 of the reference part 7. The determined recognizing feature or features for the reference part 7 are stored.

In a next step, the method comprises determining a picking zone 90 for the reference part 7, block 72, based on a combination image 82 i.e. a 2D image of the reference part 7 and the gripping tool 5. The picking zone 90 is an area defined in relation to a part 120, 122, into which area no other parts 120, 122 or other obstacles are allowed to be located in order for the gripping tool 5 to be able to pick the part 120, 122. The size and shape of the picking area depends on the size and shape of the part 120, 122 to be picked and the size and shape of the gripping tool 5. By determining the outlines 81 of the reference part 7 and the gripping tool 5 in the grasp configuration from the combination image 82 it is possible to determine the area around the reference part 7 needed for the gripping tool 5, i.e. to determine the picking zone 90. The picking zone 90 is stored, and during operation of the part picking system the positions of the parts 120, 122 to be picked as well as the respective picking zones 90 are determined.

The steps after step 34 of FIG. 3 can be made automatically by executing the teaching module 24.

Figure 6:
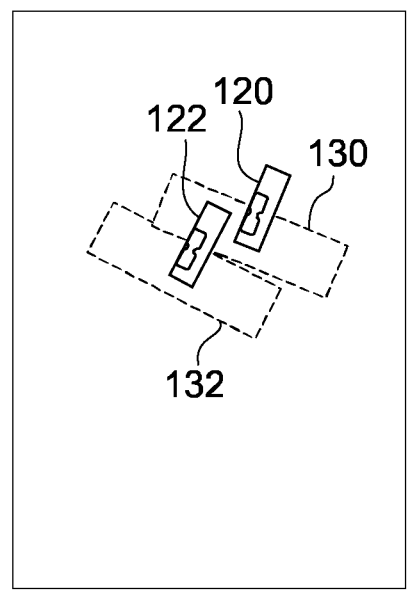
FIG. 6 shows two parts and respective picking zones.

FIG. 6 shows an example of first and second parts 120, 122 and first and second picking zones 130, 132 defined for the first and second parts 120, 122. The first part 120 is not pickable since the second part 122 is located in the first picking zone 130. However, the second part 122 is pickable since there is no other part 120, 122 or other obstacle in the second picking zone 132.

During operation of the part picking system, the system can automatically take a surface image i.e. a simple 2D image without any part 120, 122 on the picking surface 2 in order to catch any change in light conditions. The surface image taken will help later to detect the pixels corresponding to parts 120, 122 lying on the picking surface 2.

The present invention is not limited to the embodiments disclosed but may be varied and modified within the scope of the following claims. For example, the steps in the method can be carried out in different orders. The scanner unit can be replaced by one or more cameras or image sensors 16. The gripper 5 may have any suitable configuration and may instead of fingers comprise e.g. a suction tool.

The invention claimed is:

1. A method for teaching an industrial robot to pick parts, the method comprising the steps of:
    placing a reference part on a picking surface;
    providing a reference image including information about the reference part;
    placing a gripping tool of the industrial robot in relation to the reference part so that the gripping tool is in a grasp configuration in relation to the reference part; and
    storing the grasp configuration,
    wherein the reference image is a 2D image from below the picking surface.

2. The method according to claim 1, wherein the reference image is taken by means of an image scanner.

3. The method according to claim 1, wherein the picking surface is planar.

4. The method according to claim 1, wherein the reference image only contains information about those portions of the reference part that are against the picking surface.

5. The method according to claim 1, wherein the method further includes the steps of:
    determining at least one recognizing feature of the reference part based on the reference image; and
    storing the at least one recognizing feature.

6. The method according to claim 5, wherein said at least one recognizing feature of the reference part is at least a part of the outline of the reference part.

7. The method according to claim 1, wherein the method further includes the steps of:
    taking a surface image of the picking surface without any part from below;
    storing the surface image;
    detecting pixels corresponding to the recognizing feature in the reference image by using the surface image; and
    detecting the part based on the detected pixels.

8. The method according to claim 7, wherein said surface image is taken by the same means as the reference image.

9. The method according to claim 1, wherein said reference image also includes information about the gripping tool in the grasp configuration, and the method further includes the step of determining and storing a picking zone for the reference part based on the reference image.

10. The method according to claim 1, wherein the method further includes the steps of:
    taking a part image including information about at least one part located on the picking surface;
    detecting the at least one part in the part image;
    determining a position of the at least one part on the picking surface based on the part image; and
    calculating a grasp position for the gripping tool based on the determined position and the grasp configuration.

11. The method according to claim 10, wherein said part image is taken by the same means as the reference image.

12. The method according to claim 9, wherein the method further includes the step of checking if the part is reachable by the gripping tool by verifying that no other part or other obstacle on the picking surface is within the picking zone of the part to be picked based on the part image.

13. A part picking system including:
    a picking surface,
    an image device under the picking surface for providing a reference image including information about a reference part on the picking surface, and
    a gripping tool for grasping the reference part,
    wherein the part picking system further includes a data processing unit configured to calculate a relative position of the gripping tool and the reference part.

14. The method according to claim 10, wherein the method further includes the step of checking if the part is reachable by the gripping tool by verifying that no other part or other obstacle on the picking surface is within the picking zone of the part to be picked based on the part image.

15. The method according to claim 2, wherein the picking surface is planar.

16. The method according to claim 2, wherein the reference image only contains information about those portions of the reference part that are against the picking surface.

17. The method according to claim 2, wherein the method further includes the steps of:
    determining at least one recognizing feature of the reference part based on the reference image; and
    storing the at least one recognizing feature.

18. The method according to claim 2, wherein the method further includes the steps of:
    taking a surface image of the picking surface without any part from below;
    storing the surface image;
    detecting pixels corresponding to the recognizing feature in the reference image by using the surface image; and
    detecting the part based on the detected pixels.

19. The method according to claim 2, wherein said reference image also includes information about the gripping tool in the grasp configuration, and the method further includes the step of determining and storing a picking zone for the reference part based on the reference image.

20. The method according to claim 2, wherein the method further includes the steps of:
    taking a part image including information about at least one part located on the picking surface;
    detecting the at least one part in the part image;
    determining a position of the at least one part on the picking surface based on the part image; and calculating a grasp position for the gripping tool based on the determined position and the grasp configuration.

21. A method for teaching an industrial robot to pick parts, comprising:

placing a reference part on a picking surface;
placing a gripping tool of the industrial robot so that it is in a grasp configuration in relation to the reference part;
taking a 2D reference image of the grasp configuration from below the picking surface;
storing the reference image;
using the reference image to determine a gripping zone for a pickable part placed on the picking surface.

* * * * *